US010822764B2

(12) United States Patent
Voss (10) Patent No.: US 10,822,764 B2
(45) Date of Patent: Nov. 3, 2020

(54) METHOD OF CONNECTING A TOWER TO A FOUNDATION

(71) Applicant: General Electric Company, Schenectady, NY (US)

(72) Inventor: Stefan Bernhard Voss, Lingen (DE)

(73) Assignee: General Electric Company, Schenectady, NY (US)

(*) Notice: Subject to any disclaimer, the term of this patent is extended or adjusted under 35 U.S.C. 154(b) by 0 days.

(21) Appl. No.: 16/281,451

(22) Filed: Feb. 21, 2019

(65) Prior Publication Data

US 2020/0271101 A1 Aug. 27, 2020

(51) Int. Cl.
*E02D 27/42* (2006.01)
*E04H 12/34* (2006.01)
*F03D 13/20* (2016.01)

(52) U.S. Cl.
CPC ........... *E02D 27/42* (2013.01); *E02D 27/425* (2013.01); *E04H 12/34* (2013.01); *F03D 13/22* (2016.05)

(58) Field of Classification Search
CPC ....... F03D 13/22; E02D 27/42; E02D 27/425; E04H 12/34
See application file for complete search history.

(56) References Cited

U.S. PATENT DOCUMENTS

| 7,805,895 B2 | 10/2010 | Kristensen |
| 8,443,557 B2 | 5/2013 | Gevers et al. |
| 8,876,486 B2 * | 11/2014 | Tosello ............... E02D 27/42 416/246 |
| 9,175,670 B2 * | 11/2015 | Lockwood ............ F03D 13/20 |
| 10,309,074 B2 * | 6/2019 | Tozer .................. E02D 27/016 |
| 2007/0251187 A1 | 11/2007 | Schiffer et al. |
| 2009/0282774 A1 | 11/2009 | Jensen et al. |
| 2010/0132299 A1 | 6/2010 | Sathian |
| 2011/0131899 A1 | 6/2011 | Voss et al. |
| 2011/0138706 A1 | 6/2011 | Voss et al. |
| 2011/0138707 A1 | 6/2011 | Bagepalli |
| 2012/0141295 A1 * | 6/2012 | Martinez De Castaneda ............. F03D 13/10 416/244 R |

FOREIGN PATENT DOCUMENTS

| EP | 2 236 676 A1 | 10/2010 |
| EP | 2 375 057 A1 | 10/2011 |
| WO | WO 2011/007065 A1 | 1/2011 |

OTHER PUBLICATIONS

European Search Report for EP Application No. 20156947.2, dated Jul. 13, 2020.

* cited by examiner

*Primary Examiner* — Andrew J Triggs
(74) *Attorney, Agent, or Firm* — Dority & Manning, P.A.

(57) ABSTRACT

A tower foundation assembly includes a foundation having a base section and a receptacle atop the base section. The receptacle of the foundation defines a bottom surface and an inner perimeter wall. The tower foundation assembly also includes a tower, such as a wind turbine tower, secured to the inner perimeter wall within the receptacle of the foundation. As such, the tower extends in a longitudinal direction from the foundation.

13 Claims, 6 Drawing Sheets

METHOD OF CONNECTING A TOWER TO A FOUNDATION

FIELD

This invention relates generally to wind turbine towers, and more particularly, to methods of connecting wind turbine towers to a foundation.

BACKGROUND

Wind power is considered one of the cleanest, most environmentally friendly energy sources presently available, and wind turbines have gained increased attention in this regard. A modern wind turbine typically includes a nacelle fixed atop a tower, a generator and a gearbox housed with the nacelle, and a rotor configured with the nacelle having a rotatable hub with one or more rotor blades. The rotor blades capture kinetic energy of wind using known airfoil principles. The rotor blades transmit the kinetic energy in the form of rotational energy so as to turn a shaft coupling the rotor blades to a gearbox, or if a gearbox is not used, directly to the generator. The generator then converts the mechanical energy to electrical energy that may be deployed to a utility grid.

The tower typically includes a base section and an upper section. The base section of the tower is typically secured to a foundation at its lower end and the upper section of the tower at its upper end (i.e. via an L-flange). The foundation may be a concrete slab foundation, a short pole-type foundation, a deep piling foundation, or any other suitable foundation capable of supporting loads produced by wind, turbine operation, and gravitational forces with usage of an anchor cage. A typical interface between the tower base section and the anchor cage foundation has a bottom T-flange attached to a tower base adapter or a door section. Further, the concrete surface of the foundation is relatively rough so that a grout joint is formed on which the T-flange is placed.

Due to high transportation and manufacturing costs, however, the tower base adapter and the door section are becoming prohibitively expensive. For example, the bottom T-flanges must be welded to the tower base adapter and/or the door section, which requires welding certification. Weld fatigue is a critical factor contributing to increased manufacturing costs. Further, the T-flange of the tower base adapter or the door section increases transportation costs because it exceeds the transportation size limits and restricts available routes.

Accordingly, the present disclosure is directed to wind turbine towers and methods connecting wind turbine towers to a foundation that eliminate the T-flange, and in some instances the L-flange, so as to address the aforementioned issues.

BRIEF DESCRIPTION

Aspects and advantages of the invention will be set forth in part in the following description, or may be obvious from the description, or may be learned through practice of the invention In one aspect, the present disclosure is directed to a tower foundation assembly. The tower foundation assembly includes a foundation having a base section and a receptacle atop the base section. The receptacle of the foundation defines a bottom surface and an inner perimeter wall. The tower foundation assembly also includes a tower, such as a wind turbine tower, secured to the inner perimeter wall within the receptacle of the foundation. As such, the tower extends in a longitudinal direction from the foundation.

In one embodiment, the base section and the receptacle may be integral with each other. In alternative embodiments, the base section and the receptacle may be separate components secured together at a joint. In another embodiment, the base section and the receptacle may be constructed of reinforced concrete. In such embodiments, the reinforced concrete may be pre-stressed via one or more anchor bolts extending in the longitudinal direction through the receptacle and the base section of the foundation. In further embodiments, the reinforced concrete of the receptacle may be post-tensioned via one or more circular reinforcement members.

In yet another embodiment, the receptacle may include one or more radially-extending through-holes. In such embodiments, the tower foundation assembly may also include one or more fasteners arranged through the radially-extending through-hole(s) so as to secure the tower to the inner perimeter wall within the base section and the receptacle. As such, the fastener(s) are configured to activate a frictional load between the tower and the inner perimeter wall of the receptacle of the foundation.

In several embodiments, the tower foundation assembly may also include one or more stress distribution rings arranged on an inner surface of the tower and secured thereto via the one or more fasteners and one or more nuts.

In certain embodiments, the tower foundation assembly may further include a filler material at an interface of the tower and the inner perimeter wall of the receptacle of the foundation. In such embodiments, the interface may include smooth contacting surfaces, one or more structured surfaces, and/or a reinforced joint.

In yet another embodiment, the tower may also include an L-flange at a lower end thereof. As such, the L-flange may be secured to the bottom surface of the receptacle. In addition, in such embodiments, the tower foundation assembly may further include a filler material at an interface of the L-flange of the tower and the bottom surface of the receptacle.

In another aspect, the present disclosure is directed to a method for connecting a tower to a foundation. The method includes providing a foundation having a base section and a receptacle atop the base section. The receptacle of the foundation defines a bottom surface and an inner perimeter wall. The method also includes placing a tower within the receptacle of the foundation such that the tower extends in a longitudinal direction from the foundation. Further, the method includes providing a filler material at an interface of the tower and the inner perimeter wall of the receptacle of the foundation. In addition, the method includes placing one or more fasteners through one or more radially-extending through-holes of the receptacle to secure the tower within the receptacle. As such, the fastener(s) are configured to activate a frictional load between the tower and the inner perimeter wall of the receptacle of the foundation.

These and other features, aspects and advantages of the present invention will become better understood with reference to the following description and appended claims. The accompanying drawings, which are incorporated in and constitute a part of this specification, illustrate embodiments of the invention and, together with the description, serve to explain the principles of the invention.

BRIEF DESCRIPTION OF THE DRAWINGS

A full and enabling disclosure of the present invention, including the best mode thereof, directed to one of ordinary skill in the art, is set forth in the specification, which makes reference to the appended figures, in which.

DETAILED DESCRIPTION

Reference now will be made in detail to embodiments of the invention, one or more examples of which are illustrated in the drawings. Each example is provided by way of explanation of the invention, not limitation of the invention. In fact, it will be apparent to those skilled in the art that various modifications and variations can be made in the present invention without departing from the scope or spirit of the invention. For instance, features illustrated or described as part of one embodiment can be used with another embodiment to yield a still further embodiment. Thus, it is intended that the present invention covers such modifications and variations as come within the scope of the appended claims and their equivalents.

Figure 1:
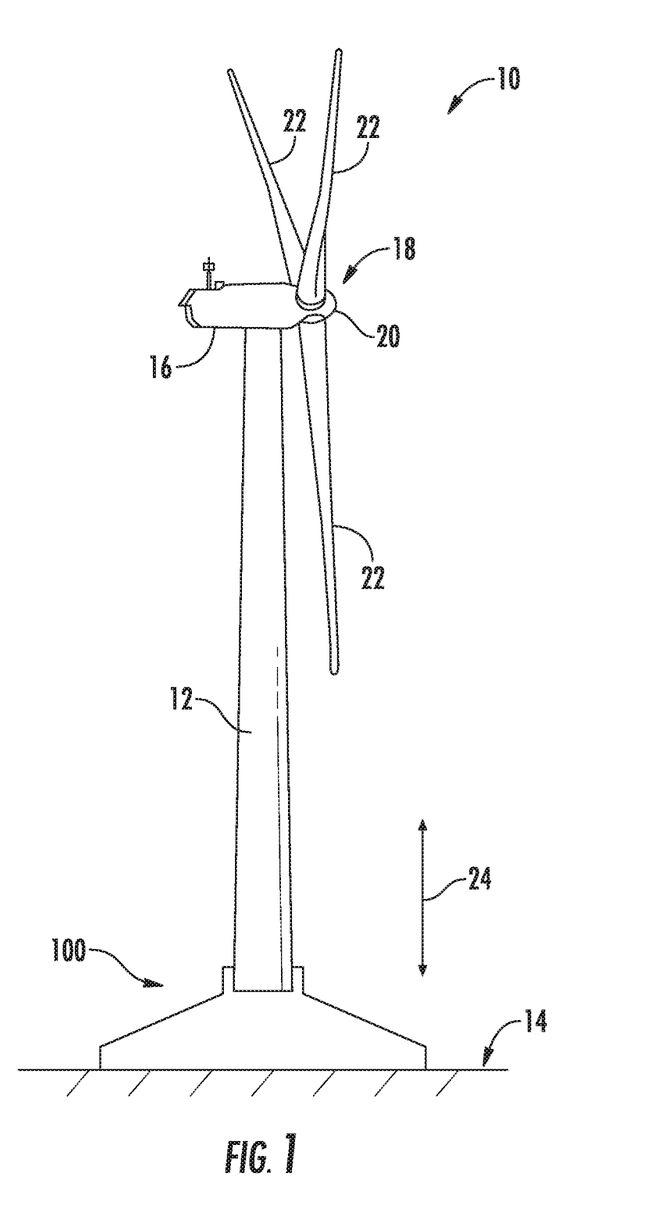
FIG. 1 illustrates a perspective view of one embodiment of a wind turbine according to the present disclosure.

Referring to the drawings, FIG. 1 illustrates a perspective view of one embodiment of a wind turbine 10 according to the present disclosure. As shown, the wind turbine 10 generally includes a tower 12 extending from a support surface 14, a nacelle 16 mounted on the tower 12, and a rotor 18 coupled to the nacelle 16. More particularly, as shown, the tower 12 is secured to the support surface 14 via a tower foundation assembly, which is described in more detail herein. The rotor 18 includes a rotatable hub 20 and at least one rotor blade 22 coupled to and extending outwardly from the hub 20. For example, in the illustrated embodiment, the rotor 18 includes three rotor blades 22. However, in an alternative embodiment, the rotor 18 may include more or less than three rotor blades 22. Each rotor blade 22 may be spaced about the hub 20 to facilitate rotating the rotor 18 to enable kinetic energy to be transferred from the wind into usable mechanical energy, and subsequently, electrical energy. For instance, the hub 20 may be rotatably coupled to an electric generator (not shown) positioned within the nacelle 16 to permit electrical energy to be produced.

Figure 2:
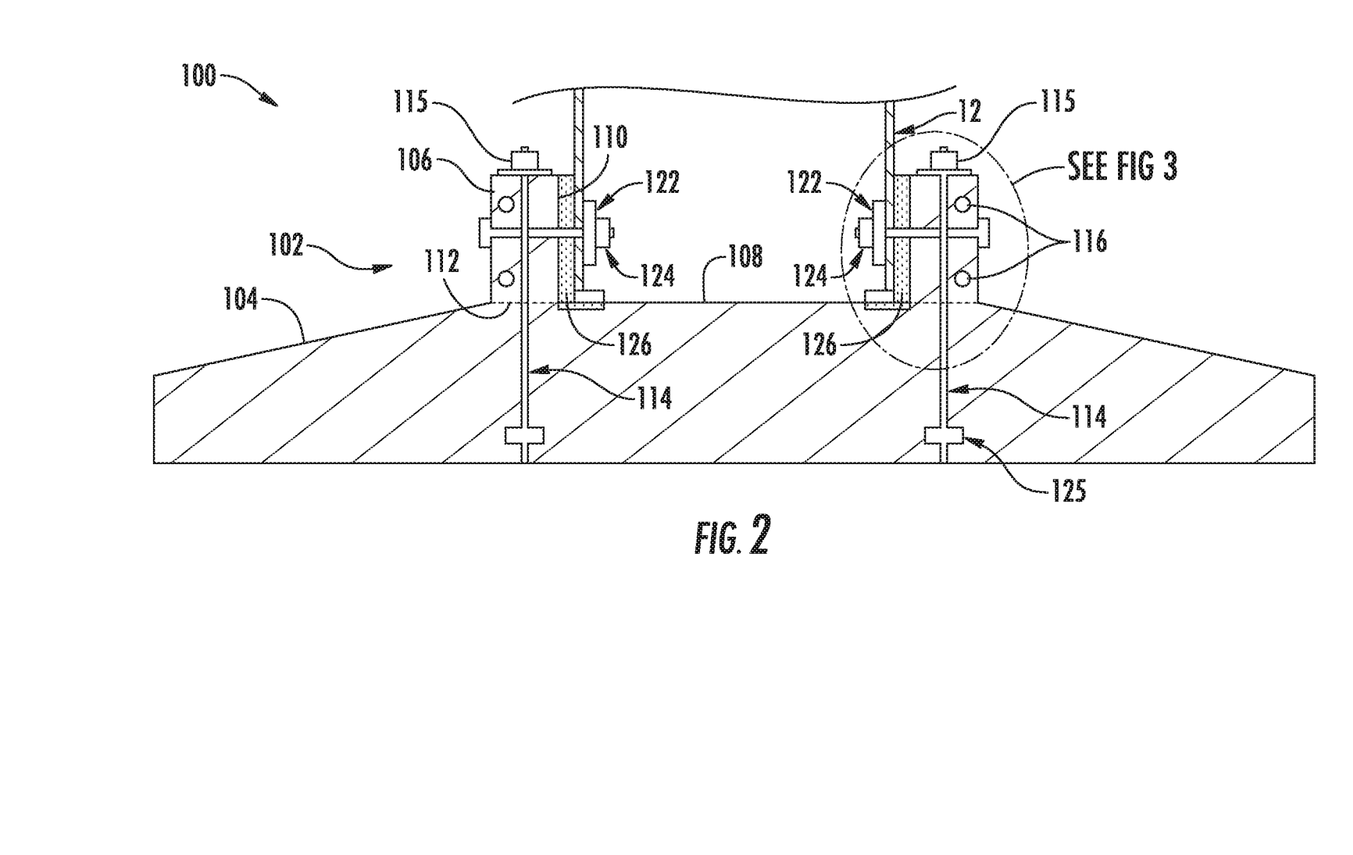
FIG. 2 illustrates a front view of one embodiment of a tower foundation assembly for a wind turbine according to the present disclosure.

Referring now to FIG. 2, a detailed, front view of one embodiment of the tower foundation assembly 100 for the wind turbine 10 according to the present disclosure is illustrated. As shown, the tower foundation assembly 100 includes a foundation 102 having a base section 104 and a receptacle 106 atop the base section 104. In particular embodiments, the base section 104 and the receptacle 106 may be constructed of reinforced concrete. The reinforced concrete may be pre-stressed via one or more anchor bolts 114 extending in the longitudinal direction 24 through the receptacle 106 and the base section 104 of the foundation 102. In further embodiments, as shown, the reinforced concrete of the receptacle 106 may also be post-tensioned via one or more circular reinforcement members 116, in particular, if the receptacle 106 is assembled from pre-fabricated components.

In addition, as shown, the anchor bolts 114 may be fixed to an anchor 125 by nuts 115. Typically, the anchor bolts 114 are fixed to anchor ring 125 and are placed together with the reinforcement within the form work of the foundation 102. Then, concrete is poured into the form work and the foundation 102 is formed. The anchor bolts 114 have a sufficient length so that they extend from the anchor ring 125 to the upper surface of the foundation 102 and protrude therefrom.

Further, the receptacle 106 shown in FIG. 2 has a circular ring-shaped form. However, it should be understood that the receptacle 106 may have any other desired form and that the outer shape of the receptacle 106 may be adjusted to the cross-section of the tower 12. Further, as shown, the receptacle 106 of the foundation 102 defines a bottom surface 108 and an inner perimeter wall 110. In addition, as shown, the tower foundation assembly 100 also includes the tower 12, which is secured to the inner perimeter wall 110 within the receptacle 106 of the foundation 102. More specifically, the tower 12 may define an outer surface 26 and an inner surface 28 separated by a thickness 30 such that the tower can be easily secured to the inner perimeter wall 110 of the receptacle 106, e.g. through the thickness 30. Thus, as shown, the tower 12 extends in a longitudinal direction 24 (FIG. 1) from the foundation 102.

Referring still to FIG. 2, in certain embodiments, the base section 104 and the receptacle 106 may be separate components secured together at a joint 112. In such embodiments, the joint 112 can be formed between the in-situ foundation 102 and a pre-fabricated receptacle 106 if the receptacle 106 is not manufactured in-situ. In addition, in certain embodiments, the pre-fabricated receptacle 106 may include one or more starter bars for connecting the pre-fabricated receptacle 106 to the foundation body 102. In alternative embodiments, the base section 104 and the receptacle 106 may both be formed in-situ such that the base section 104 and the receptacle 106 are integral with each other and the joint 112 is eliminated.

Figure 3:
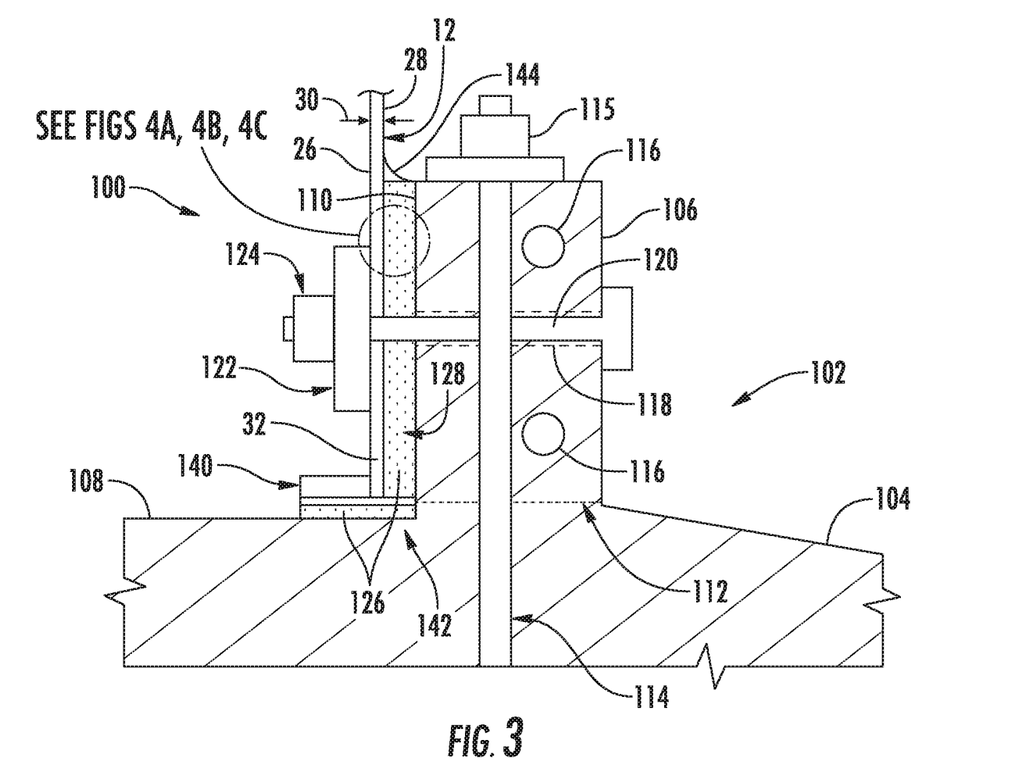
FIG. 3 illustrates a detailed view of a portion of the tower foundation assembly of FIG. 2.

Referring now to FIG. 3, a detailed view of a portion of the tower foundation assembly 100 of FIG. 2 is illustrated. As shown, the receptacle 106 may further include one or more radially-extending through-holes 118. In such embodiments, the tower foundation assembly 100 may also include one or more fasteners 120 (e.g. such as high-strength bolts) arranged through the radially-extending through-hole(s) 118 so as to secure the tower 12 to the inner perimeter wall 110 within the receptacle 106 of the foundation 102. As such, the post-tensioned fastener(s) 120 are configured to activate a frictional load between the tower 12 and the inner perimeter wall 110 of the receptacle 106 of the foundation 102.

Figure 4A:
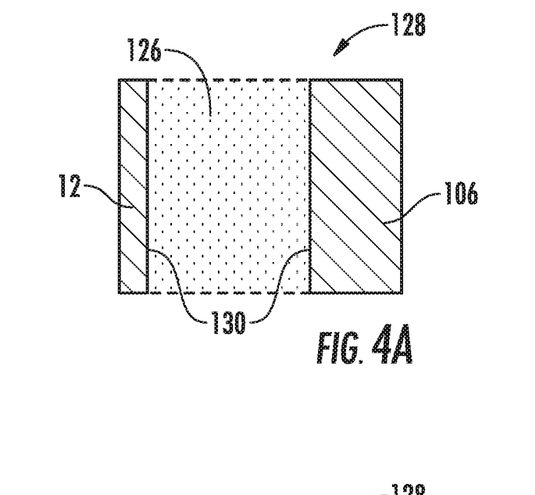
FIG. 4A illustrates a detailed view of one embodiment of an interface of the tower and the inner perimeter wall of the receptacle of the foundation of the tower foundation assembly of FIG. 2, particularly illustrating an interface having smooth surfaces.
Figure 4B:
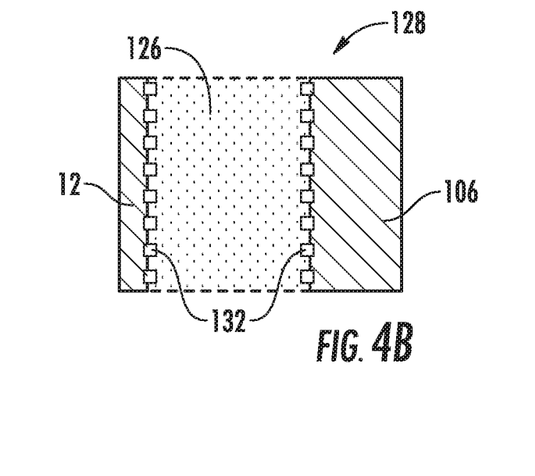
FIG. 4B illustrates a detailed view of one embodiment of an interface of the tower and the inner perimeter wall of the receptacle of the foundation of the tower foundation assembly of FIG. 2, particularly illustrating an interface having structured surfaces.
Figure 4C:
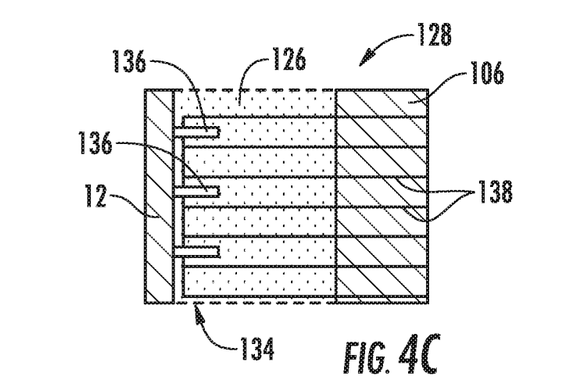
FIG. 4C illustrates a detailed view of one embodiment of an interface of the tower and the inner perimeter wall of the receptacle of the foundation of the tower foundation assembly of FIG. 2, particularly illustrating an interface having a reinforced joint.

More specifically, in certain embodiments, the tower foundation assembly 100 may include a filler material 126 at an interface 128 of the tower 12 and the inner perimeter wall 110 of the receptacle 106 of the foundation 102. For example, in one embodiment, the filler material may be a grout material. Referring to FIGS. 4A, 4B, and 4C, various embodiments of the interface 128 are illustrated. For example, as shown in FIG. 4A, the interface 128 may include smooth or blank contacting surfaces 130 between the tower 12 and the inner perimeter wall 110 of the receptacle 106 and the filler material 126. Alternatively, as shown in FIG. 4B, the interface 128 may include one or more structured surfaces 132 between the tower 12 and the inner perimeter wall 110 of the receptacle 106 and the filler material 126. For example, as shown, the structured surfaces 132 may include a rough surface, a grooved surface, a surface with protrusions or ribs, or similar. Thus, such features are configured to assist in activating the frictional load between the tower 12 and the inner perimeter wall 110 of the receptacle 106. In still another embodiment, as shown in FIG. 4C, the interface 128 may include a reinforced joint 134 between the tower 12 and the inner perimeter wall 110 of the receptacle 106. For example, as shown, the reinforced joint 134 may include one or more first reinforcement members 136 (e.g. welded-on headed bolts) extending from the tower wall and into the filler material 126. In addition, as shown, the receptacle 106 may also include one or more second reinforcement members 138 (e.g. reinforcement stirrups) that extend into the filler material 126 such that the first and second reinforcement members 136, 138 are interleaved within the filler material 126 to create the reinforced joint 134. In yet another embodiment, the joint between the tower wall and the top of the filler material 126 may be sealed, e.g. via sealant 144, to prevent water ingress to the joint.

Referring back to FIG. 3, the tower foundation assembly 100 may also include one or more stress distribution rings 122 arranged on the inner surface 26 of the tower 12 and secured thereto via the fastener(s) 120 and one or more nuts 124. In addition, as shown, the tower 12 may also include a flange 140, such as an L-flange or a T-flange, at a lower end 32 thereof. As such, the flange 140 may be secured to the bottom surface 108 of the receptacle 106 using various connections means. For example, in one embodiment, the flange 140 of the tower 12 may be bolted to the bottom surface 108 of the receptacle 106. Alternatively, the flange 140 of the tower 12 may be bonded to the bottom surface 108 of the receptacle 106, e.g. using an adhesive. In addition, as shown particularly in FIG. 3, the tower foundation assembly 100 may further include filler material 126 (such as grout) at an interface 142 of the flange 140 of the tower 12 and the bottom surface 108 of the receptacle 106.

Figure 5:
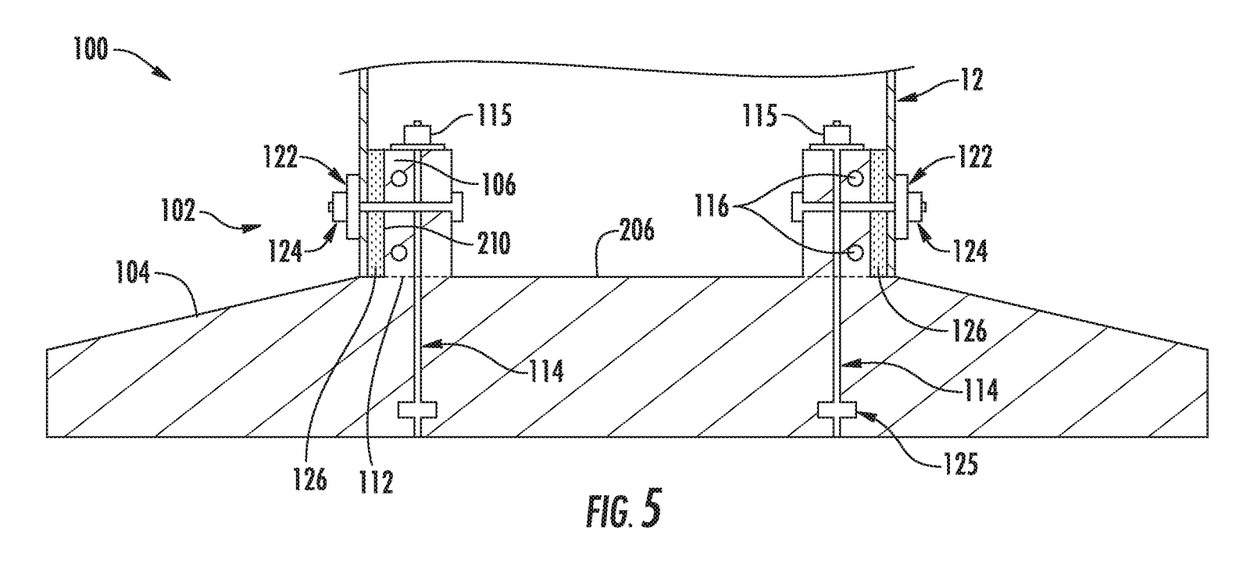
FIG. 5 illustrates a front view of another embodiment of a tower foundation assembly for a wind turbine according to the present disclosure.

Referring now to FIG. 5, a detailed, front view of another embodiment of the tower foundation assembly 100 for the wind turbine 10 according to the present disclosure is illustrated. As shown, the tower foundation assembly 100 includes a foundation 102 having a base section 104 and a protrusion 206 protruding from a top surface of the base section 104. Further, as shown, the protrusion 206 defines an outer perimeter wall 210. In such embodiments, rather than being received within the receptacle 106, the tower 12 is secured to the base section 104 and to the outer perimeter wall 210 of the protrusion 206 such that the protrusion 206 extends within an interior of the tower 12. In such embodiments, the fasteners 120 are configured to activate a frictional load between the tower 12 and the outer perimeter wall 210 of the protrusion 206 of the foundation 102. In yet another embodiment, perimeter walls may be installed on both sides of the tower wall to build the receptacle.

Figure 6:
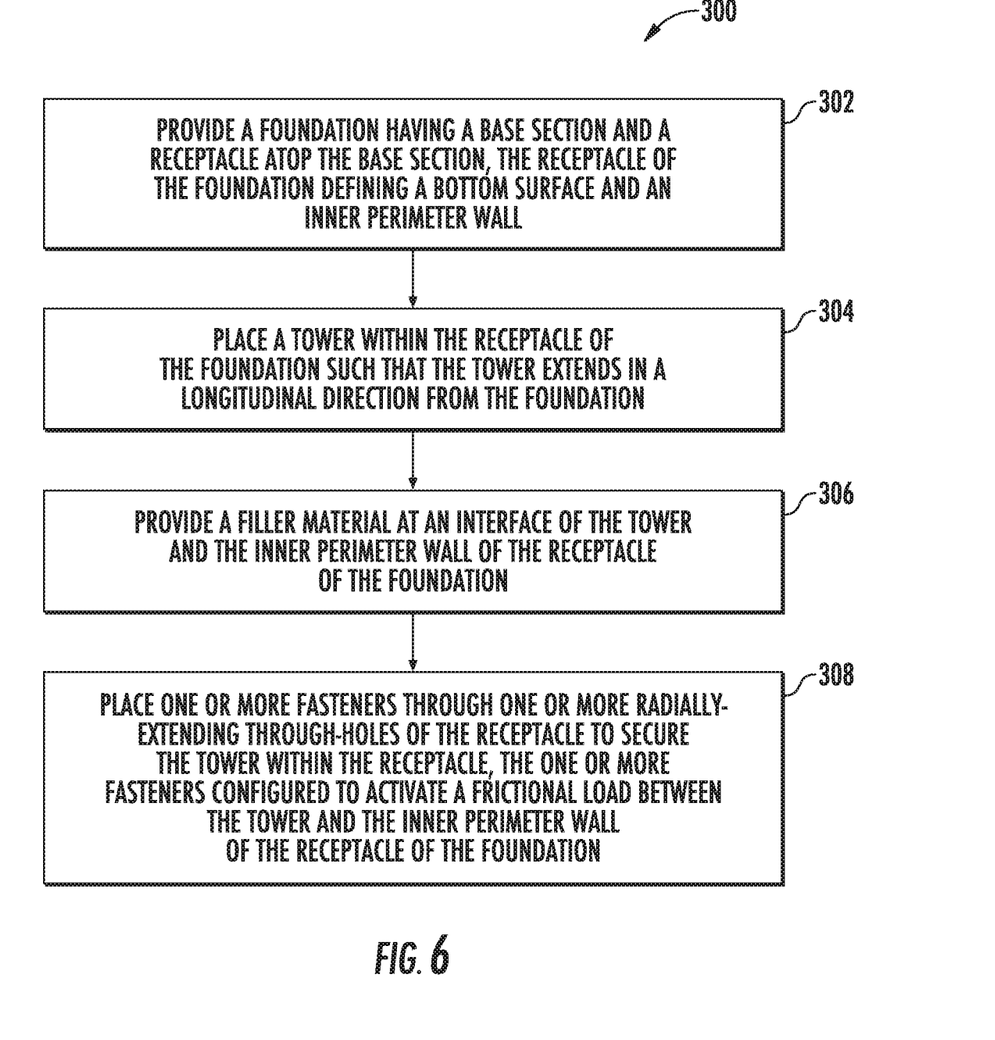
FIG. 6 illustrates a flow diagram of one embodiment of a method for connecting a tower to a foundation according to the present disclosure.

Referring now to FIG. 6, a flow diagram of one embodiment of a method 300 for connecting a tower to a foundation according to the present disclosure is illustrated. More specifically, the present disclosure describes a method to connect a tower to a foundation via activation of shear loading between the concrete of the foundation and the tower shell. Thus, the method 300 of the present disclosure allows the connection of a steel tube tower to a concrete foundation without a conventional T-Flange which would have a larger diameter than the shell itself. As discussed herein, this is achieved by activating the friction forces between the tower shell and the grouted joint of a vertical concrete receptacle as part of the foundation.

In general, the method 300 will be described herein with reference to the tower foundation assembly 100 of FIGS. 1-3. However, it should be appreciated that the disclosed method 300 may be implemented with tower foundation assemblies having any other suitable configurations. In addition, although FIG. 5 depicts steps performed in a particular order for purposes of illustration and discussion, the methods discussed herein are not limited to any particular order or arrangement. One skilled in the art, using the disclosures provided herein, will appreciate that various steps of the methods disclosed herein can be omitted, rearranged, combined, and/or adapted in various ways without deviating from the scope of the present disclosure.

As shown at (302), the method 300 may include providing the foundation 102 having the base section 104 and the receptacle 106 atop the base section 104. As shown at (304), the method 300 may include placing the tower 12 within the receptacle 106 of the foundation 102 such that the tower 12 extends in the longitudinal direction 24 from the foundation 102. Typically, placing the tower 12 within the receptacle 106 is done by means of a mobile crane. As shown at (306), the method 300 may include providing the filler material 126 at the interface 128 of the tower 12 and the inner perimeter wall 110 of the receptacle 106 of the foundation 102. As shown at (308), the method 300 may include placing the fastener(s) 120 through radially-extending through-hole(s) 118 of the receptacle 106 to secure the tower 12 within the receptacle 106. As such, the fastener(s) 118 are configured to activate a frictional load between the tower 12 and the inner wall 110 of the receptacle 106 of the foundation 102.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they include structural elements that do not differ from the literal language of the claims, or if they include equivalent structural elements with insubstantial differences from the literal languages of the claims.

What is claimed is:
1. A tower foundation assembly, comprising:
a foundation comprising a base section and a receptacle recessed within a top surface of the base section, the receptacle of the foundation defining a bottom surface and an inner perimeter wall, the receptacle comprising one or more radially-extending through-holes; and,
a tower positioned atop the bottom surface within the receptacle, the tower secured to the inner perimeter wall of the receptacle of the foundation via one or more fasteners extending through the one or more radially- extending through-holes, the tower extending in a longitudinal direction from the foundation.

2. The tower foundation assembly of claim 1, wherein the base section and the receptacle are integral with each other.

3. The tower foundation assembly of claim 1, wherein the base section and the receptacle are separate components secured together at a joint, the receptacle being a prefabricated component.

4. The tower foundation assembly of claim 1, wherein the base section and the receptacle are constructed of reinforced concrete.

5. The tower foundation assembly of claim 4, wherein the reinforced concrete is pre-stressed via one or more anchor bolts extending in the longitudinal direction through the receptacle and the base section of the foundation.

6. The tower foundation assembly of claim 4, wherein the reinforced concrete of the receptacle is post-tensioned via one or more circular reinforcement members.

7. The tower foundation assembly of claim 1, wherein the one or more fasteners are configured to activate a frictional load between the tower and the inner perimeter wall of the receptacle of the foundation.

8. The tower foundation assembly of claim 7, further comprising one or more stress distribution rings arranged on an inner surface of the tower and secured thereto via the one or more fasteners and one or more nuts.

9. The tower foundation assembly of claim 1, further comprising a filler material at an interface of the tower and the inner perimeter wall of the receptacle of the foundation.

10. The tower foundation assembly of claim 9, wherein the interface further comprises at least one of smooth contacting surfaces, one or more structured surfaces, and/or a reinforced joint.

11. The tower foundation assembly of claim 1, wherein the tower comprises at least one flange at a lower end thereof, the flange secured to the bottom surface of the receptacle.

12. The tower foundation assembly of claim 11, further comprising a filler material at an interface of the flange of the tower and the bottom surface of the receptacle.

13. The tower foundation assembly of claim 1, wherein the tower is a wind turbine tower.

* * * * *